US012739500B2

(12) United States Patent
Li

(10) Patent No.: US 12,739,500 B2
(45) Date of Patent: Sep. 15, 2026

(54) METHOD AND APPARATUS FOR IMAGE DATA TRANSMISSION

(71) Applicant: PUWELL TECHNOLOGY LLC, New York, NY (US)

(72) Inventor: Jie Li, Hangzhou (CN)

(73) Assignee: PUWELL TECHNOLOGY LLC, New York, NY (US)

( * ) Notice: Subject to any disclaimer, the term of this patent is extended or adjusted under 35 U.S.C. 154(b) by 136 days.

(21) Appl. No.: 18/655,852

(22) Filed: May 6, 2024

(65) Prior Publication Data

US 2025/0119641 A1 Apr. 10, 2025

(30) Foreign Application Priority Data

Oct. 8, 2023 (CN) ......................... 202311294259.7

(51) Int. Cl.
*H04N 23/66* (2023.01)
*H04N 23/90* (2023.01)

(52) U.S. Cl.
CPC ............. *H04N 23/66* (2023.01); *H04N 23/90* (2023.01)

(58) Field of Classification Search
CPC ........ H04N 23/66; H04N 23/90; H04N 25/76; H04N 25/78
See application file for complete search history.

(56) References Cited

U.S. PATENT DOCUMENTS

2022/0245084 A1* 8/2022 Kim ...................... G06F 1/3278
2023/0164123 A1* 5/2023 Miyamoto ............. H04L 65/70
713/168

* cited by examiner

*Primary Examiner* — Christopher K Peterson
(74) *Attorney, Agent, or Firm* — NICHOLSON DE VOS WEBSTER & ELLIOTT LLP

(57) ABSTRACT

Methods, apparatus, and computer programs are disclosed for image data transmission for a camera system. In one embodiment, a camera system is disclosed to include a plurality of camera image sensors each including a Mobile Industry Processor Interface (MIPI) Differential Physical Layer (D-PHY) interface and a circuit to process image frames obtained from the plurality of camera image sensors through a single MIPI D-PHY interface of the circuit, and the circuit to transmit one or more trigger signals to the plurality of camera image sensors to cause obtaining the image frames from the plurality of camera image sensors one at a time based on the one or more trigger signals, the image frames to be transmitted through a single MIPI D-PHY connection between the single MIPI D-PHY interface of the circuit and MIPI D-PHY interfaces of the plurality of camera image sensors.

12 Claims, 4 Drawing Sheets

METHOD AND APPARATUS FOR IMAGE DATA TRANSMISSION

CROSS-REFERENCE TO RELATED APPLICATIONS

This application claims priority to Chinese Application No. 202311294259.7, entitled "A Method of Image Data Transmission for a Camera System, Camera System, and Computer Program Product," filed on Oct. 8, 2023, and it is hereby incorporated by reference.

TECHNICAL FIELD

Embodiments of the disclosure relate to the field of data transmission; and more specifically, the embodiments are related to image data transmission for a camera system and a computer program product to implement the camera system.

BACKGROUND ART

The Mobile Industry Processor Interface (MIPI) is an open standard for mobile application processors initiated by the MIPI Alliance. It is divided into physical and logical layers. According to the Physical Standard, the MIPI standards include several physical layers including Differential Physical Layer (D-PHY), Clock-Aware Physical Layer (C-PHY), and Mobile Physical Layer (M-PHY). The logical layer of D-PHY mainly targets Camera Serial Interface (CSI) and Display Serial Interface (DSI) applications, with "D" in D-PHY corresponding to the Roman numeral for 500, indicating its initial version supports up to 500 Mbits/s. D-PHY uses differential signal transmission (not entirely differential, as Low-power (LP) is single-ended transmission), each lane consists of two signal lines, named P and N. A clock lane is essential, and the number of data lanes can be chosen based on the data transmission throughput, with at least one data lane required.

Currently, multi-camera systems commonly utilize multiple camera image sensors (CISs). The CISs may be implemented using Complementary Metal-Oxide-Semiconductor (CMOS) image sensors. These camera implementations require the image data from multiple CISs to be transmitted to a single camera's System on a chip (SoC), commonly adopting Scheme One and Scheme Two.

FIG. 1 illustrates a first scheme (Scheme One) to utilize multiple camera image sensors (CISs) for data transmission. As shown in FIG. 1, Scheme One has four MIPI D-PHY on the SoC chip 101, receiving data from CIS1 152 to CIS4 158 through four links (e.g., cables) in parallel. The image data transmission control logic is as follows: After powering up, CIS1 152 to CIS4 158 continuously output image data according to configuration, and SoC 101 receives the image data from CIS1 152 to CIS4 158 through four MIPI D-PHY, storing it in the corresponding memory buffer. Scheme One requires multiple MIPI D-PHY, which, compared to a single MIPI-PHY scheme, occupies more chip area when designing and manufacturing the camera SoC chip. Also, multiple MIPI interfaces require more pins during packaging, both of which increase the cost of the camera SoC chip, thereby increasing the cost of implementing the camera scheme.

FIG. 2 illustrates a second scheme (Scheme Two) to utilize multiple Complementary camera image sensors (CISs) for data transmission. As shown in FIG. 2, Scheme Two has only one MIPI D-PHY on the SoC 201, connected to a MIPI Switch chip through one link (e.g., cable), with four CISs 252 to 258 also connected to the MIPI Switch through four links. The SoC 201 controls the MIPI Switch chip 231 to switch among four channels via a switch control signal (Switch Ctl as shown) 221, sequentially receiving data from CIS1 to CIS4 at references 252 to 258. The image data transmission control logic is as follows: After powering up, CIS1 to CIS4 at references 252 to 258 continuously output image data according to configuration; Step 1: The SoC 201 first controls the MIPI Switch 231 to switch to channel 1 through switch control signal 221, and after receiving a complete frame of image data from CIS1, stores it in the corresponding memory buffer; Step 2: Then, the SoC 201 controls the MIPI Switch 231 to switch to channel 2, and after receiving a complete frame of image data from CIS2, stores the complete frame of image data; similarly for Steps 3 and 4 with CIS3 256 and CIS4 258. This process is iteratively executed for Steps 1 to 4, polling and storing image data from CIS1 252 to CIS4 258 in the corresponding memory buffers. Scheme Two requires an additional MIPI Switch chip, thereby increasing the overall cost of implementing the camera scheme.

BRIEF DESCRIPTION OF THE DRAWINGS

The disclosure may best be understood by referring to the following description and accompanying drawings that are used to show embodiments of the disclosure.

DETAILED DESCRIPTION

Embodiments in this disclosure provide methods for image data transmission that connect multiple CMOS image sensors via a single MIPI D-PHY. These methods reduce the design and manufacturing costs of multi-camera SoC, thereby lowering the cost of camera implementation.

The following sections, in conjunction with the embodiments of this invention, will clearly and completely describe the technical solutions in the embodiments. Obviously, the described embodiments are only part of the embodiments of this invention, not all of them. Based on the embodiments in this invention, all other embodiments obtained by those of ordinary skill in the art without making inventive efforts are within the scope of protection of this invention.

First Set of Embodiments for Simplified MIPI Data Transmission

Figure 3:
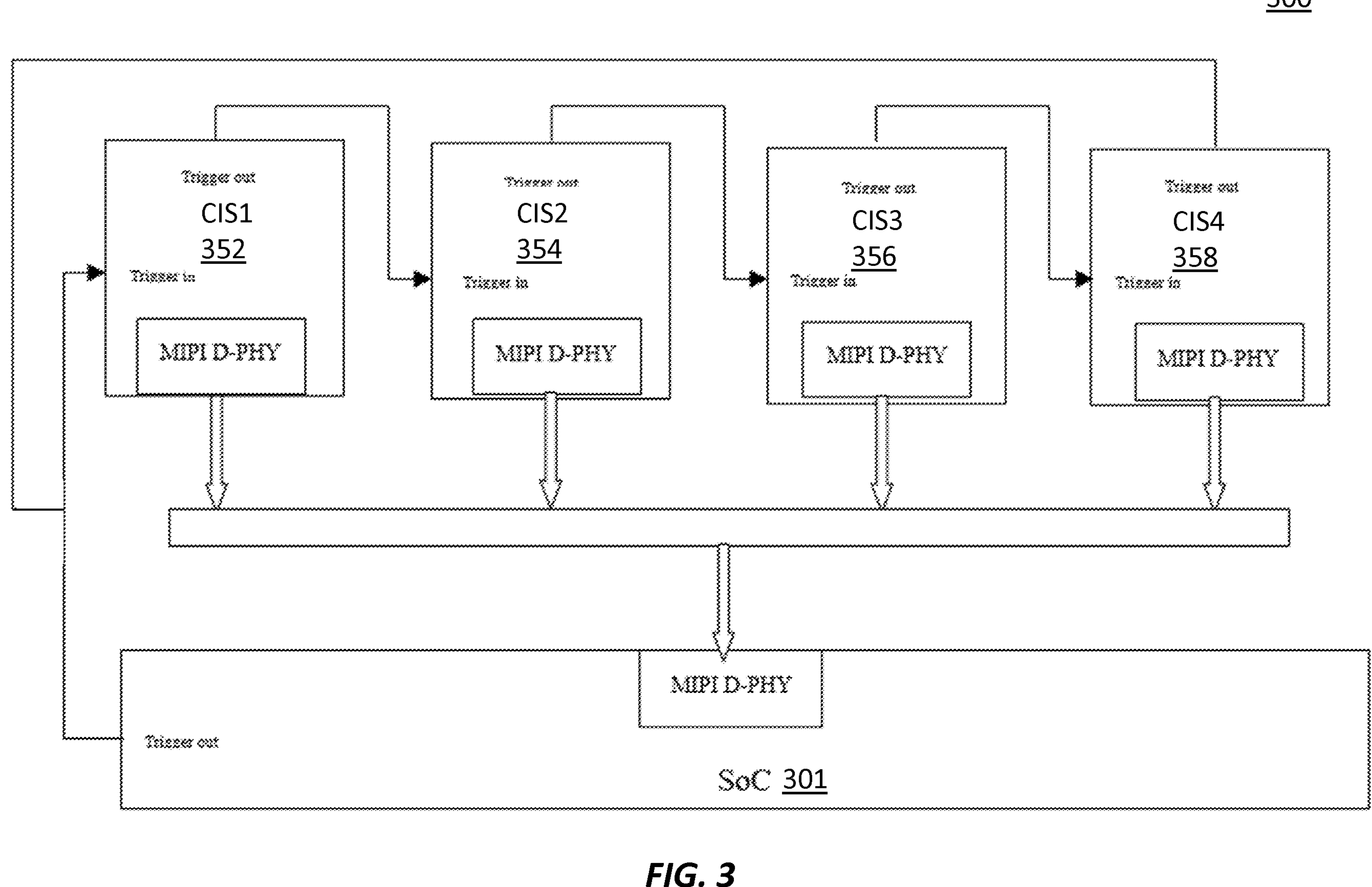
FIG. 3 illustrates a first set of embodiments to simplify Mobile Industry Processor Interface (MIPI) data transmission per the disclosure.

For example, methods are disclosed for image data transmission connecting multiple camera image sensors via a single MIPI D-PHY in some embodiments. FIG. 3 illustrates a first set of embodiments to simplify Mobile Industry Processor Interface (MIPI) data transmission per the disclosure. System 300 is a camera system that captures, processes, and stores visual information. System 300 utilizes multiple camera image sensors CIS1 to CIS4 at references 352 to 358. The method involves setting one MIPI D-PHY for data transmission and one input/output (I/O) interface on the camera SoC chip for controlling camera image sensors (CISs). The SoC chip is connected to n camera image sensors CIS1 352 to CISn 358 via a MIPI D-PHY chip through a bus.

In some embodiments, the image data transmission control logic operates as the following: After powering up, the MIPI D-PHY interfaces of CIS1 352 to CISn 358 are configured to be in a high impedance state as the initial state. Upon receiving a trigger (e.g., a signal to transmit), CIS1 352 starts outputting one frame of image data. The image data output by CIS1 352 carries virtual channel (VC) tag information conforming to the MIPI Virtual Channel standard. After the output is complete, CIS1 352 returns the MIPI D-PHY interface to high impedance state, and after a delay determined by previously configured delay parameters, outputs a Trigger signal from the Trigger out to the Trigger in of CIS2 354. CIS2 354 repeats the operations, and the rest of CIS in the camera system follows.

For example, upon receiving a trigger indicating that CISn−1 has completed, CISn−1 starts outputting one frame of image data. The image data output by CISn−1 carries VC tag information conforming to the MIPI Virtual Channel standard. After completion, CIS n−1 returns the MIPI D-PHY to high impedance state, and after a delay determined by previously configured delay parameters, outputs a Trigger signal from the Trigger out to the Trigger in of CISn.

By iteratively executing data transmission through CIS1 to CISn, the MIPI D-PHY of the SoC continuously receives image data; and based on the VC tag information in the data, stores the image data from CIS1 to CISn in the corresponding memory buffer.

In some embodiments, the mentioned VC tag information allows multiple image data sources to transmit data through a single physical channel; the header of the data packet contains a Virtual Channel Identifier (VCID) used to distinguish data from different virtual channels.

Some embodiments may implement at least one of two types of data packets, both of which contain the VCID field. A short packet includes data type, virtual channel ID, and a data field with a set of bits (e.g., 6 bits); while a long packet includes data type, virtual channel ID, data length, followed by a variable-length data payload, and an authenticity check (e.g., Cyclic Redundancy Check).

In some embodiments, when multiple CISs transmit data to the SoC via a single physical channel, after each CIS completes data transmission, a delay parameter is set before triggering the next CIS to transmit data. This delay amount is configured by the SoC for the CIS, which can control the volume of data transmitted in a unit of time to match the data processing capability of the SoC.

In some embodiments, the value n≥3, e.g., between 4 to 10.

Figure 1:
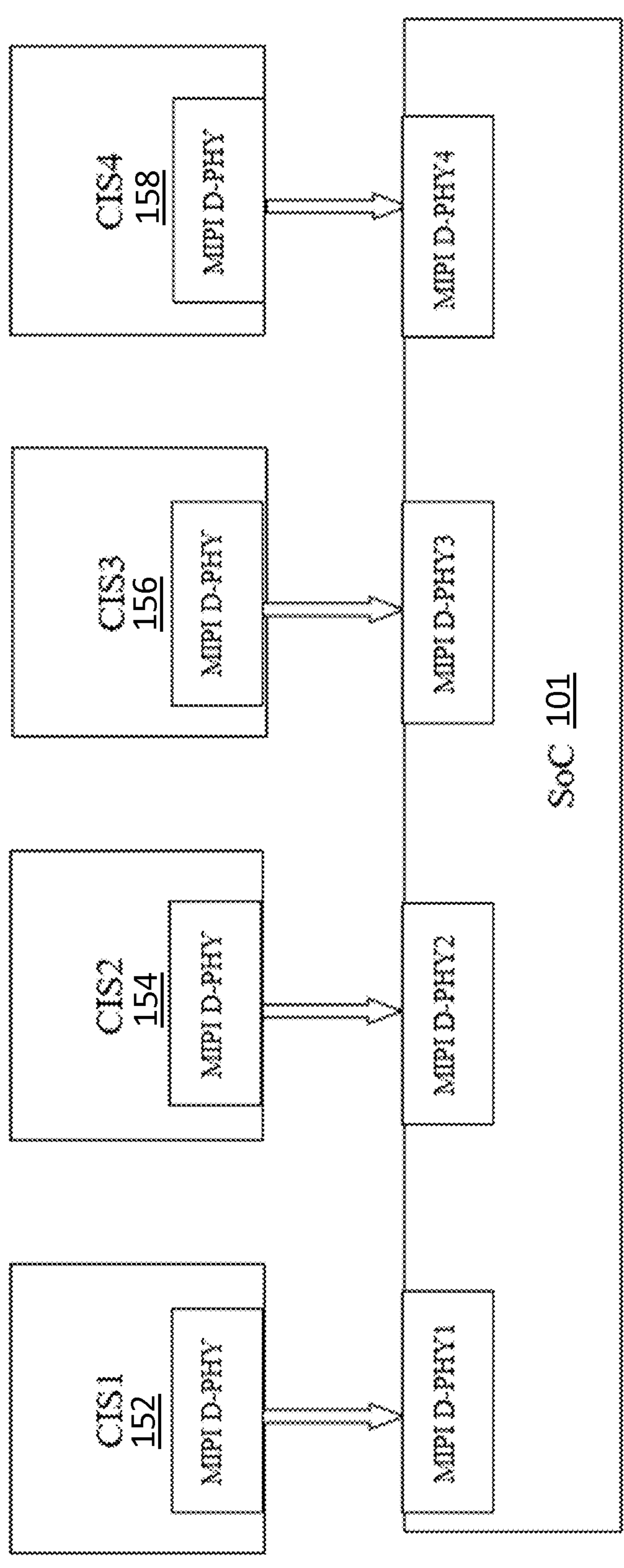
FIG. 1 illustrates a first scheme (Scheme One) to utilize multiple camera image sensors.
Figure 2:
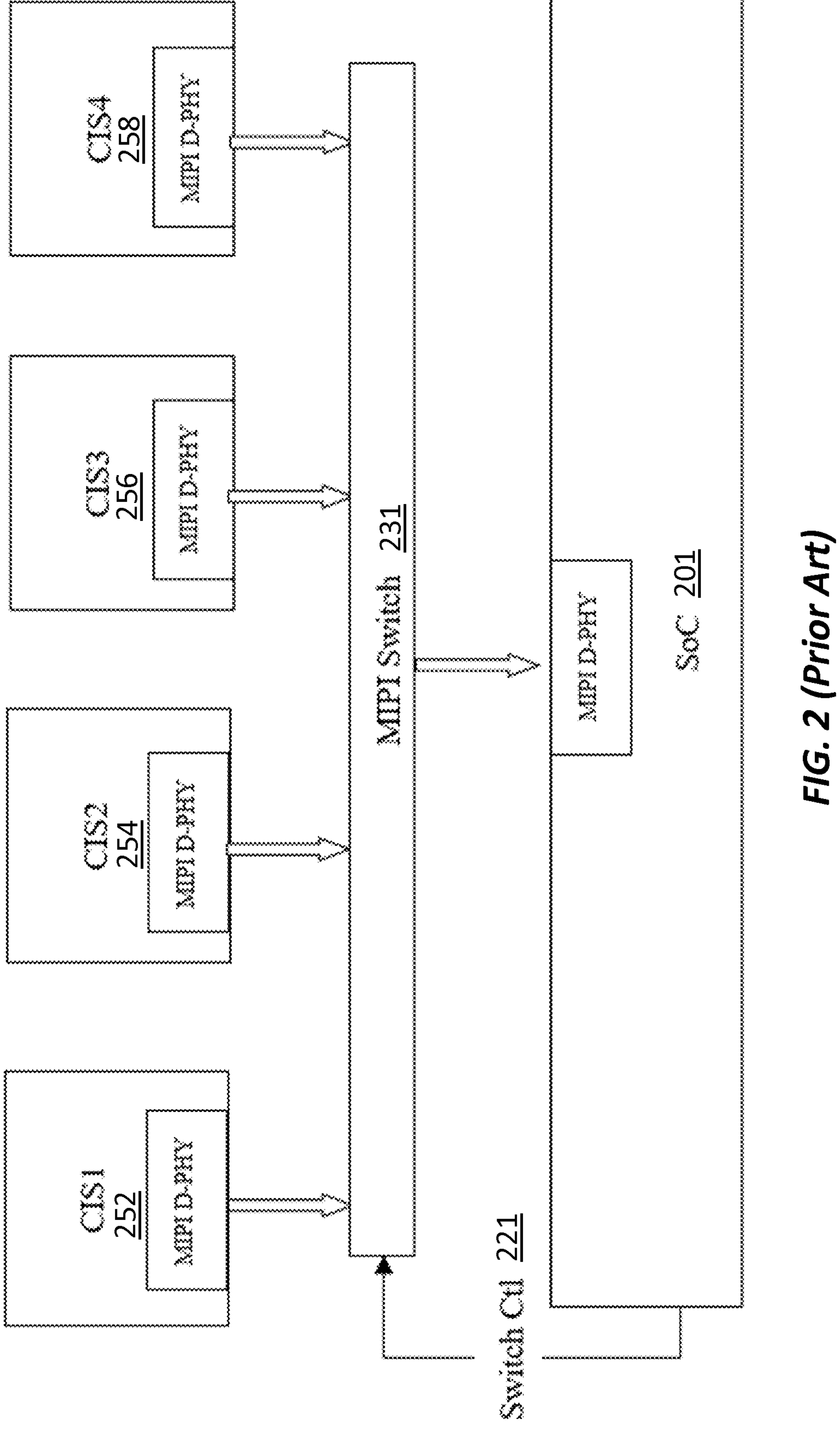
FIG. 2 illustrates a scheme (Scheme Two) to utilize multiple camera image sensors.

In these embodiments, a single trigger is provided from a SoC to cause multiple CISs to coordinate in their data transmission through a single MIPI D-PHY without requiring multiple MIPI D-PHY as in FIG. 1 or an additional MIPI switch as in FIG. 2. These embodiments thus provide more cost-efficient ways to implement camera systems.

Second Set of Embodiments for Simplified MIPI Data Transmission

Figure 4:
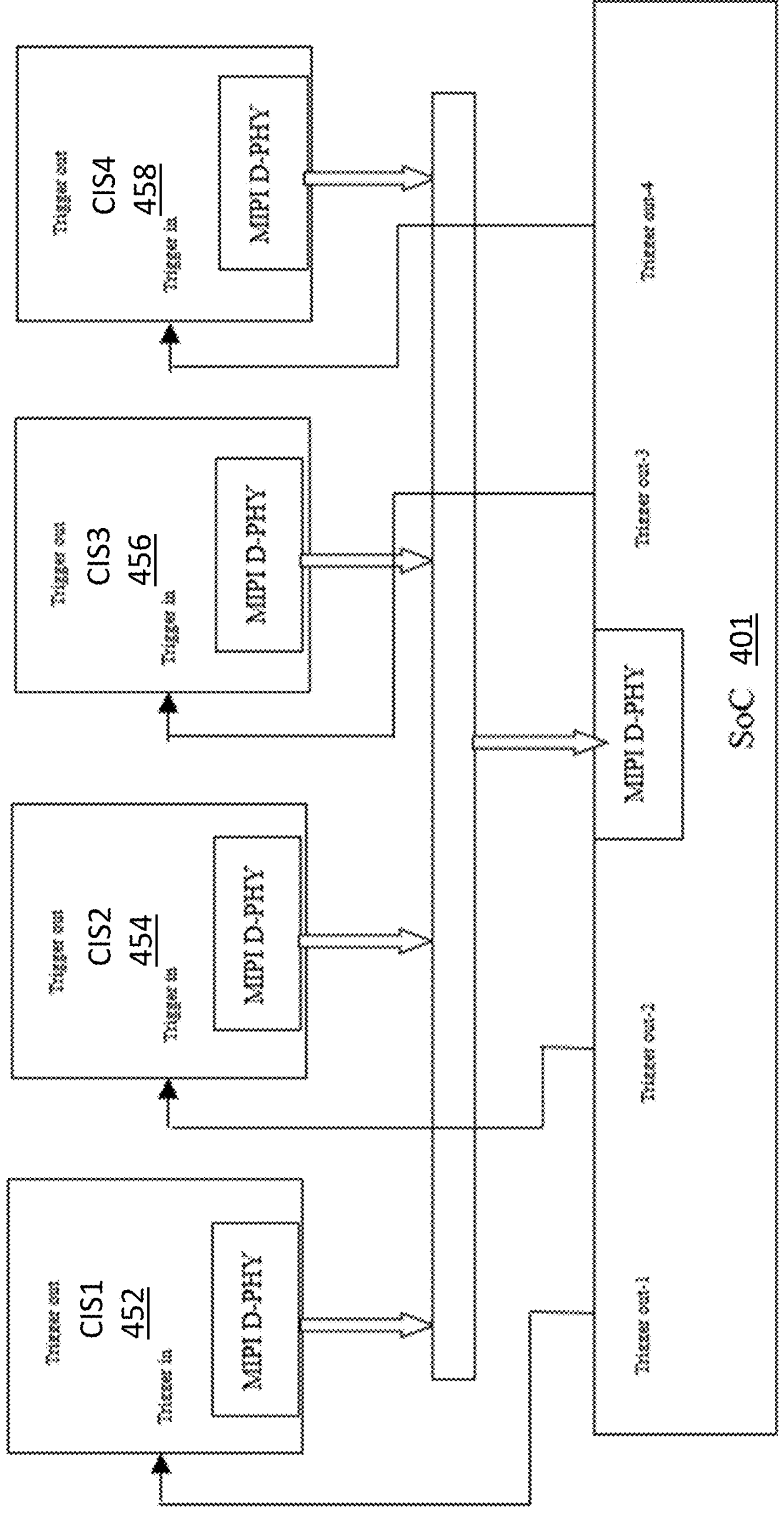
FIG. 4 illustrates a second set of embodiments to simplify Mobile Industry Processor Interface (MIPI) data transmission per the disclosure.

Additionally, methods are disclosed for image data transmission connecting multiple CMOS image sensors via a single MIPI D-PHY in other embodiments. FIG. 4 illustrates a second set of embodiments to simplify Mobile Industry Processor Interface (MIPI) data transmission per the disclosure. System 400 is a camera system similar to system 300 and same/similar references indicate elements or components having the same or similar functionalities. The method involves setting one MIPI D-PHY interface and multiple input/output (I/O) interfaces on the camera SoC chip for controlling multiple camera image sensor CISs.

In some embodiments, the SoC 401 and the four camera image sensors CIS1 452 to CIS4 458 are directly connected via the MIPI D-PHY chip through a star topology bus. The image data transmission control logic may perform the following operations.

After powering up, in the initial state, according to configuration, the MIPI D-PHY of CIS1 452 to CIS4 458 are in a high impedance state;

Step1: SoC 401 outputs a Trigger signal from the Trigger out-1 to the Trigger in of CIS1 452; upon receiving the Trigger, CIS1 452 starts to output one frame of image data. After completing the output, CIS1 452 returns the MIPI D-PHY to a high impedance state;

And so on;

Step n−1: SoC 401 outputs a Trigger signal from the Trigger out-n−1 to the Trigger in of CISn−1; upon receiving the Trigger, CISn−1 starts outputting one frame of image data. After completing the output, CISn−1 returns the MIPI D-PHY to a high impedance state;

Step n: SoC 401 outputs a Trigger signal from the Trigger out-n to the Trigger in of CISn; upon receiving the Trigger, CISn starts outputting one frame of image data. After completing the output, CISn returns the MIPI D-PHY to a high impedance state;

Iteratively execute Steps 1-4, the MIPI D-PHY of SoC 401 continuously receives image data, and based on the status information from Trigger out, stores the image data from CIS1 452 to CIS4 458 in the corresponding memory buffer.

While four CISs are shown in FIG. 4, the number of CISs, n≥3, e.g., between 4 to 10 in some embodiments.

Furthermore, this disclosure also provides a surveillance camera system, which includes a camera SoC chip and n camera image sensors CIS1 to CISn. The camera SoC chip is equipped with one MIPI D-PHY chip and one I/O for controlling the camera image sensor CIS. The SoC chip and n camera image sensors CIS1 to CISn are directly connected through a star topology bus via the MIPI D-PHY chip; alternatively, the camera SoC chip is equipped with one MIPI D-PHY chip and n I/Os for controlling the camera image sensors CIS, directly connected through a star topology bus. The image data transmission control logic uses the aforementioned method.

Further, this disclosure also provides a computing device comprising a memory, a processor, and a computer program stored in the memory. The characteristic feature is that the processor executes the computer program to implement the aforementioned method.

Furthermore, this disclosure provides a computer-readable storage medium, which stores a computer program or instructions. When executed by a processor, this computer program or instructions implement the described method.

Due to the adoption of the aforementioned technical solutions, this invention requires only one MIPI D-PHY, which can reduce the design and manufacturing costs of multi-camera SoCs, thereby lowering the cost of camera implementation.

Further Explanation: Embodiment 1

As shown in FIG. 3, a method for image data transmission connecting multiple CMOS image sensors via a single MIPI D-PHY, involves setting one MIPI D-PHY chip and one I/O for controlling the camera image sensor CIS on the camera SoC chip. The SoC chip and four camera image sensors CIS1 to CIS4 are directly connected via the MIPI D-PHY chip through a star topology bus; the image data transmission control logic is as follows:

After powering up, in the initial state, according to the configuration, the MIPI D-PHY of CIS1 to CIS4 are in a high impedance state;

The SoC outputs a Trigger signal from the Trigger out to the Trigger in of CIS1;

Step 1: Upon receiving a Trigger, CIS1 starts to output one frame of image data. The image data output by CIS1 carries VC tag information conforming to the MIPI Virtual Channel standard. After completing the output, CIS1 returns the MIPI D-PHY to a high impedance state, and after a delay determined by previously configured delay parameters, outputs a Trigger signal from the Trigger out to the Trigger in of CIS2;

Step 2: Similarly, upon receiving a Trigger, CIS2 begins to output one frame of image data. The image data output by CIS2 carries VC tag information conforming to the MIPI Virtual Channel standard. After completing the output, CIS2 returns the MIPI D-PHY to a high impedance state, and after a delay determined by previously configured delay parameters, outputs a Trigger signal from the Trigger out to the Trigger in of CIS3;

Step 3: Following the same pattern, upon receiving a Trigger after CIS3 has completed, it begins to output one frame of image data. The image data output by CIS3 carries VC tag information conforming to the MIPI Virtual Channel standard. After completing the output, CIS3 returns the MIPI D-PHY to a high impedance state, and after a delay determined by previously configured delay parameters, outputs a Trigger signal from the Trigger out to the Trigger in of CIS4;

Step 4: Finally, upon receiving a Trigger after CIS4 has completed, it begins to output one frame of image data. The image data output by CIS4 carries VC tag information conforming to the MIPI Virtual Channel standard. After completing the output, CIS4 returns the MIPI D-PHY to a high impedance state, and after a delay determined by previously configured delay parameters, outputs a Trigger signal from the Trigger out to the Trigger in of CIS1;

Cyclically execute Steps 1-4, the MIPI D-PHY of the SoC continuously receives image data, and based on the VC tag information within the data, stores the image data from CIS1 to CIS4 in the corresponding memory buffer.

Further Explanation: Embodiment 2

As shown in FIG. 4, a method for image data transmission connecting multiple CMOS image sensors via a single MIPI D-PHY involves setting one MIPI D-PHY chip and four I/Os for controlling the camera image sensors CIS on the camera SoC chip. The SoC chip and the four camera image sensors CIS1 to CIS4 are directly connected via the MIPI D-PHY chip through a star topology bus; the image data transmission control logic is as follows:

After powering up, in the initial state, according to configuration, the MIPI D-PHY of CIS1 to CIS4 are in a high impedance state;

Step1: The SoC outputs a Trigger signal from the Trigger out-1 to the Trigger in of CIS1; upon receiving the Trigger, CIS1 starts to output one frame of image data. After completing the output, CIS1 returns the MIPI D-PHY to a high impedance state;

Step2: The SoC outputs a Trigger signal from the Trigger out-2 to the Trigger in of CIS2; upon receiving the Trigger, CIS2 begins to output one frame of image data. After completing the output, CIS2 returns the MIPI D-PHY to a high impedance state;

Step3: The SoC outputs a Trigger signal from the Trigger out-3 to the Trigger in of CIS3; upon receiving the Trigger, CIS3 begins to output one frame of image data. After completing the output, CIS3 returns the MIPI D-PHY to a high impedance state;

Step4: The SoC outputs a Trigger signal from the Trigger out-4 to the Trigger in of CIS4; upon receiving the Trigger, CIS4 begins to output one frame of image data. After completing the output, CIS4 returns the MIPI D-PHY to a high impedance state;

Cyclically execute Steps 1-4, the MIPI D-PHY of the SoC continuously receives image data, and based on the status information from Trigger out, stores the image data from CIS1 to CIS4 in the corresponding memory buffer.

In these embodiments, a plurality of triggers is provided from a SoC to cause multiple CISs to coordinate in their data transmission through a single MIPI D-PHY without requiring multiple MIPI D-PHY as in FIG. 1 or an additional MIPI switch as in FIG. 2. These embodiments thus provide more cost-efficient ways to implement camera systems.

The resource requirements comparison between Embodiment 1, Embodiment 2, and existing Schemes 1 and 2 of the invention is as follows:

| Scheme | CIS D-PHY to SoC D-PHY | MIPI Switch | Number of SoC I/Os Used | Number of CIS I/Os Used | VC Support | MIPI Clock |
|---|---|---|---|---|---|---|
| Scheme One | 1 to 1 | Not required | 0 | 0 | Not required | f |
| Scheme Two | n to 1, n is determined by MIPI Switch | Required | n, determined by MIPI Switch | 0 | Not required | Approximately n*f |
| Embodiment 1 | n to 1, n < 4 | Not required | 1 | 2 | Required | Approximately n*f |
| Embodiment 2 | n to 1, n < 4 | Not required | 4 | 1 | Not required | Approximately n*f |

Note that "f" represents the frequency of the MIPI clock, and 'n' represents the number of channels. The term "approximately n*f" suggests a proportional relationship between the number of channels and the frequency of the MIPI clock.

Our solutions are Embodiment 1 and Embodiment 2. Compared to Scheme 1, as only one MIPI D-PHY is required, the design and manufacturing costs of multi-camera SoCs can be reduced, thereby lowering the cost of camera implementation. Compared to Scheme 2, the overall cost of the camera solution is also reduced as it eliminates the need for a MIPI Switch chip.

Embodiment 1, compared to Embodiment 2, requires fewer I/O pins on the camera SoC chip. Although one trigger out I/O pin needs to be added at the CIS end, due to the common CSP packaging of CIS, the cost increase due to the additional I/O pins is very low or even negligible. Therefore, Embodiment 1 is a more optimal solution compared to Embodiment 2.

The above description of embodiments enables those skilled in the art to implement or use the invention. Various modifications to these embodiments will be readily apparent to those skilled in the art, and the general principles defined herein may be applied to other embodiments without departing from the spirit or scope of the invention. Thus, the invention is not intended to be limited to the embodiments shown herein but is to be accorded the widest scope consistent with the principles and novel features disclosed herein.

EXAMPLES

Example 1. A method for transmitting image data from multiple CMOS image sensors through a single MIPI D-PHY connection, characterized in that a camera System on Chip (SoC) is equipped with one MIPI D-PHY chip and an IO for controlling the Camera Image Sensors (CIS), wherein the SoC chip is directly connected to multiple camera image sensors CIS1 to CISn via a star-type bus; the image data transmission control logic is as follows:

After power up, in the initial state, the MIPI D-PHYs of CIS1 to CISn are in a high impedance state;

Step 1: Upon receiving a Trigger, CIS1 begins to output one frame of image data. The image data output by CIS1 contains VC (Virtual Channel) tag information compliant with the MIPI Virtual Channel specification. After the output is completed, CIS1 returns the MIPI D-PHY to a high impedance state. After a delay set by pre-configured delay parameters, a Trigger signal is output from the Trigger out port to the CIS2 Trigger in port;

Step 2: Upon receiving the Trigger, CIS2 begins to output one frame of image data. The image data output by CIS2 contains VC tag information compliant with the MIPI Virtual Channel specification. After the output is completed, CIS2 returns the MIPI D-PHY to a high impedance state. After a delay set by pre-configured delay parameters, a Trigger signal is output from the Trigger out port to the CIS3 Trigger in port;

This process is repeated until:

Step n−1: After CISn−1 completes its output upon receiving a Trigger, it outputs one frame of image data. The image data output by CISn−1 contains VC tag information compliant with the MIPI Virtual Channel specification. After the output is completed, CISn−1 returns the MIPI D-PHY to a high impedance state. After a delay set by pre-configured delay parameters, a Trigger signal is output from the Trigger out port to the CISn Trigger in port;

Step n: After CISn completes its output upon receiving a Trigger, it outputs one frame of image data. The image data output by CISn contains VC tag information compliant with the MIPI Virtual Channel specification. After the output is completed, CISn returns the MIPI D-PHY to a high impedance state. After a delay set by pre-configured delay parameters, a Trigger signal is output from the Trigger out port to the CIS1 Trigger in port;

The process from Step 1 to Step n is cyclically executed, with the SoC's MIPI D-PHY continuously receiving image data. Based on the VC tag information in the data, the image data from CIS1 to CISn is stored in corresponding memory buffers.

Example 2. The image data transmission method according to Example 1, characterized in that the VC tag information allows multiple image data sources to transmit data through a single physical channel; the header of the data packet includes a Virtual Channel Identifier (VCID) for differentiating data from different virtual channels.

Example 3. The image data transmission method according to Example 2, characterized in that the data packet consists of short packets and long packets, both types of packets containing a VCID field;

Short packet: includes data type, Virtual Channel ID, and a 6-bit data field;

Long packet: includes data type, Virtual Channel ID, data length, followed by a variable-length data payload, and finally a CRC check.

Example 4. The image data transmission method according to Example 1, characterized in that in Steps 1 to n, when multiple CIS transmit data to the SoC through a single physical channel, each CIS, after completing its data transmission, sets a delay parameter delay, and then triggers the next CIS to transmit data. This delay is configured by the SoC for the CIS and can control the amount of data transmitted in a unit of time to match the SoC's data processing capabilities.

Example 5. The image data transmission method according to Example 1, characterized in that n≥3; preferably 4-10.

What is claimed is:

1. A camera system, comprising:

a plurality of camera image sensors each including a Mobile Industry Processor Interface (MIPI) Differential Physical Layer (D-PHY) interface; and a circuit to process image frames obtained from the plurality of camera image sensors through a single MIPI D-PHY interface of the circuit based on a single trigger signal from the circuit, the circuit to transmit the single trigger signal through a corresponding input/output (I/O) interface of the circuit to a first camera image sensor of the plurality of camera image sensors, the single trigger signal causes image frame transmission by the first camera image sensor, wherein completion of the image frame transmission by the first camera image sensor causes image frame transmission by a second camera image sensor of the plurality of camera image sensors, wherein the circuit obtains the image frames from the plurality of camera image sensors one at a time in sequence, the image frames to be transmitted through a single MIPI D-PHY connection between the single MIPI D-PHY interface of the circuit and MIPI D-PHY interfaces of the plurality of camera image sensors.

2. The camera system of claim 1, wherein the circuit is to transmit the single trigger signal to the first camera image sensor as a first trigger input to the first camera image sensor, and wherein the first camera image sensor is to be triggered to transmit a first set of image frames from the first camera image sensor towards the circuit and to transmit a first trigger output to the second camera image sensor as a second trigger input to the second camera image sensor, and wherein the second camera image sensor is to be triggered to transmit a second set of image frames from the second camera image sensor towards the circuit and to transmit a second trigger output to a third camera image sensor of the plurality of camera image sensors as a third trigger input to the third camera image sensor.

3. The camera system of claim 2, wherein the first camera image sensor is to be triggered to transmit the first trigger output to the second camera image sensor of the plurality of camera image sensors as the second trigger input to the second camera image sensor after a previously configured delay.

4. The camera system of claim 3, wherein the previously configured delay is set based on data processing capability of the circuit.

5. The camera system of claim 2, wherein the first camera image sensor's MIPI D-PHY interface is to enter a high impedance state after transmission of the first set of image frames from the first camera image sensor towards the circuit.

6. The camera system of claim 1, wherein transmitting a first image frame from a first camera image sensor towards the circuit comprises transmitting virtual channel (VC) tag information of the first image frame to identify from which camera image sensor the first image frame is transmitted.

7. The camera system of claim 6, wherein the virtual channel (VC) tag information of the first image frame comprises a virtual channel (VC) identifier (ID) with a header of the first image frame.

8. The camera system of claim 6, wherein the circuit is to store the first image frame to a buffer apart from one to store a second image frame transmitted from a second camera image sensor based on the virtual channel (VC) tag information of the first image frame.

9. The camera system of claim 1, wherein the image frames transmitted from the plurality of camera image sensors include packets that each comprise a data type field, a virtual channel (VC) identifier (ID) field, a data field with a set of bits.

10. The camera system of claim 9, wherein at least a subset of the packets further comprises a data length field to indicate length of the data field and an authenticity check field.

11. The camera system of claim 1, wherein the image frames transmitted from the plurality of camera image sensors are transmitted through a same physical channel of the single MIPI D-PHY connection.

12. The camera system of claim 1, wherein the circuit is a System on a chip (SoC) that comprises a chip dedicated to providing the single MIPI D-PHY connection.

* * * * *